US 12,454,220 B2

United States Patent
Kawai

(10) Patent No.: US 12,454,220 B2
(45) Date of Patent: Oct. 28, 2025

(54) GETTING-OUT ASSISTANCE APPARATUS

(71) Applicant: TOYOTA JIDOSHA KABUSHIKI KAISHA, Aichi (JP)

(72) Inventor: Tasuku Kawai, Toyota (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 67 days.

(21) Appl. No.: 18/424,864

(22) Filed: Jan. 29, 2024

(65) Prior Publication Data

US 2024/0253561 A1 Aug. 1, 2024

(30) Foreign Application Priority Data

Feb. 1, 2023 (JP) ................................. 2023-013908

(51) Int. Cl.
*B60Q 9/00* (2006.01)
*B60Q 3/217* (2017.01)
*B60R 1/12* (2006.01)
*G08G 1/16* (2006.01)

(52) U.S. Cl.
CPC ............ *B60Q 9/008* (2013.01); *G08G 1/166* (2013.01); *B60Q 3/217* (2017.02); *B60R 1/12* (2013.01)

(58) Field of Classification Search
None
See application file for complete search history.

(56) References Cited

U.S. PATENT DOCUMENTS

| | | | | |
|---|---|---|---|---|
| 6,985,073 | B1 * | 1/2006 | Doan | B60Q 9/008 |
| | | | | 340/474 |
| 9,327,726 | B2 * | 5/2016 | Braunberger | G08G 1/166 |
| 9,969,261 | B2 | 5/2018 | Kodama | |
| 10,017,178 | B2 * | 7/2018 | Morimoto | B60W 30/14 |
| 10,045,173 | B1 | 8/2018 | Morimura et al. | |
| 10,106,157 | B2 | 10/2018 | Sawada et al. | |
| 10,150,407 | B2 | 12/2018 | Takahashi et al. | |
| 10,696,297 | B2 | 6/2020 | Nguyen Van et al. | |
| 11,001,255 | B2 | 5/2021 | Fukuman et al. | |
| 11,110,937 | B2 | 9/2021 | Kinoshita et al. | |
| 12,256,302 | B2 * | 3/2025 | Vassilovski | H04W 4/90 |
| 2002/0039070 | A1 * | 4/2002 | Ververs | G01C 23/00 |
| | | | | 340/901 |

(Continued)

FOREIGN PATENT DOCUMENTS

JP 2022-048511 A 3/2022

*Primary Examiner* — Muhammad Adnan
(74) *Attorney, Agent, or Firm* — HAUPTMAN HAM, LLP

(57) ABSTRACT

A getting-out assistance apparatus performs alerting to an occupant of a vehicle by an alerting device of the vehicle to inform the occupant of a presence of a moving object approaching the vehicle and having a probability of coming into contact with at least one door of the vehicle if the at least one door is opened. The apparatus determines a manner of the alerting performed by the alerting device depending on at least one of alerting device type information, vehicle destination information, and control unit specification information. The alerting device type information corresponds to information on a type of the alerting device installed in the vehicle. The vehicle destination information corresponds to information on a destination of the vehicle. The control unit specification information corresponds to information specifications of the electronic control unit which activates the alerting device.

7 Claims, 11 Drawing Sheets

(56) References Cited

U.S. PATENT DOCUMENTS

| | | | |
|---|---|---|---|
| 2017/0151994 A1* | 6/2017 | Braunberger | G02B 27/01 |
| 2017/0162054 A1* | 6/2017 | Nespolo | B60Q 9/008 |
| 2017/0190287 A1* | 7/2017 | Gjoni | G08B 21/24 |
| 2019/0001968 A1 | 1/2019 | Yorifuji et al. | |
| 2019/0344828 A1 | 11/2019 | Omori et al. | |
| 2019/0389488 A1 | 12/2019 | Yamada et al. | |
| 2021/0225168 A1* | 7/2021 | Hoh | E05B 77/00 |
| 2021/0276486 A1* | 9/2021 | Fukuta | G01S 13/58 |
| 2021/0287548 A1* | 9/2021 | Lai | B60R 1/025 |
| 2022/0080886 A1 | 3/2022 | Takeuchi et al. | |
| 2022/0169238 A1* | 6/2022 | Hokai | B60W 40/08 |
| 2023/0202502 A1* | 6/2023 | Saitoh | B60K 28/12 340/436 |
| 2024/0067087 A1* | 2/2024 | Tucker | B60R 21/013 |
| 2024/0169832 A1* | 5/2024 | Patel | G08G 1/096741 |
| 2025/0029495 A1* | 1/2025 | Pan | B60Q 9/00 |

* cited by examiner

GETTING-OUT ASSISTANCE APPARATUS

CROSS-REFERENCE TO RELATED APPLICATIONS

This application claims priority to Japanese patent application No. JP 2023-013908 filed on Feb. 1, 2023, the content of which is hereby incorporated by reference in its entirety.

BACKGROUND

Field

The present invention relates to a getting-out assistance apparatus.

Description of the Related Art

There is known a getting-out assistance apparatus which activates an alerting device to alert occupants of a vehicle to a presence of a moving object which is approaching the vehicle and may come into contact with a door of the vehicle when the door is opened (for example, refer to JP 2022-48511 A).

As the aforementioned alerting device, various options such as mirror indicators mounted on side mirrors of the vehicle and door indicators installed on doors of the vehicle are available. In this regard, characteristics of the alerting devices vary depending on the type thereof. Therefore, it is preferable to perform alerting depending on types of the alerting devices installed in the vehicle in order to provide appropriate alerting to the occupants of the vehicle. Further, an appropriate manner of the alerting may vary depending on destination of the vehicle. Therefore, it is preferable to perform the alerting depending on the destination of the vehicle in order to provide appropriate alerting to the occupants.

SUMMARY

An object of the present invention is to provide a getting-out assistance device which can perform alerting depending on the type or the like of the alerting device.

A getting-out assistance apparatus according to the present invention comprises an electronic control unit which is configured to perform alerting to an occupant of a vehicle by an alerting device of the vehicle to inform the occupant of a presence of a moving object when a predetermined alerting condition becomes satisfied. The moving object is an object which is approaching the vehicle and has a probability of coming into contact with at least one door of the vehicle if the at least one door is opened. The electronic control unit is configured to determine a manner of the alerting performed by the alerting device depending on at least one of alerting device type information, vehicle destination information, and control unit specification information. The alerting device type information corresponds to information on a type of the alerting device installed in the vehicle. The vehicle destination information corresponds to information on a destination of the vehicle. The control unit specification information corresponds to information specifications of the electronic control unit which activates the alerting device.

With the getting-out assistance apparatus according to the present invention, the alerting is performed based on the type of the alerting device, the destination of the vehicle, and the specifications of the control device. Therefore, an appropriate alerting can be provided to the occupants of the vehicle.

In the getting-out assistance apparatus according to an aspect of the present invention, the alerting device may include at least one mirror indicator, and/or at least one door indicator, and/or at least one door illuminator. In this aspect, the at least one mirror indicator may be an indicator mounted on at least one side mirror of the vehicle. The at least one door indicator may be an indicator mounted on the at least one door. The at least one door illuminator may be an illuminator mounted on the at least one door. The alerting device type information may include information that the at least one mirror indicator, or the at least one door indicator, or the at least one door illuminator is mounted as the alerting device.

With the getting-out assistance apparatus according to this aspect of the present invention, the alerting can be performed by the mirror indicators, the door indicators, and the door illuminators.

Further, in the getting-out assistance apparatus according to another aspect of the present invention, the alerting device may include at least one mirror indicator mounted on at least one side mirror of the vehicle. In this aspect, the alerting device type information may include information that the at least one mirror indicator is mounted as the alerting device. The vehicle destination information may include information on a predetermined area which corresponds to an area where a predetermined manner of the alerting performed by the at least one mirror indicator is permitted. The electronic control unit may be configured to perform the alerting by activating the at least one mirror indicator when (i) the alerting device type information indicates that the at least one mirror indicator is mounted as the alerting device, and (ii) the vehicle destination information indicates that the destination of the vehicle is an area other than the predetermined area.

With the getting-out assistance apparatus according to this aspect of the present invention, the alerting is performed depending on the type of the alerting device and the destination of the vehicle. Therefore, the appropriate alerting can be provided to the occupants of the vehicle.

Furthermore, in the getting-out assistance apparatus according to further another aspect of the present invention, the electronic control unit may be configured to perform the alerting by activating the at least one mirror indicator when (i) the alerting device type information indicates that the at least one mirror indicator is mounted as the alerting device, (ii) the vehicle destination information indicates that the destination of the vehicle is the predetermined area, and (iii) the manner of the alerting performed by the at least one mirror indicator is permitted at the predetermined area.

With the getting-out assistance apparatus according to this aspect of the present invention, the alerting is performed depending on the type of the alerting device and the destination of the vehicle. Therefore, the appropriate alerting can be provided to the occupants of the vehicle."

Furthermore, in the getting-out assistance apparatus according to further another aspect of the present invention, the alerting device may include at least one front seat door indicator mounted on at least one front seat door of the vehicle and at least one rear seat door indicator mounted on at least one rear seat door of the vehicle. In this aspect, the alerting device type information may include information that the at least one front seat door indicator and the at least one rear seat door indicator are mounted as the alerting device. The control unit specification information may include (i) information on the number of drive circuits which activates the at least one front seat door indicator and the at least one rear seat door indicator, and (ii) information on whether the at least one front seat door indicator and the at least one rear seat door indicator are activated by the drive circuits independently or simultaneously. The electronic control unit may be configured to, in a situation where (i) the alerting device type information indicates that the at least one front seat door indicator and the at least one rear seat door indicator are mounted as the alerting device, and (ii) the control unit specification information indicates that the electronic control unit includes the number of the drive circuits which can activate the at least one front seat door indicator and the at least one rear seat door indicator independently and is configured to activate the at least one front seat door indicator and the at least one rear seat door indicator independently, perform the alerting by activating the at least one front seat door indicator when a front seat alerting condition as the alerting condition becomes satisfied, and perform the alerting by activating the at least one rear seat door indicator when a rear seat alerting condition as the alerting condition becomes satisfied. In addition, the electronic control unit may be configured to, in a situation where (i) the alerting device type information indicates that the at least one front seat door indicator and the at least one rear seat door indicator are mounted as the alerting device, and (ii) the control unit specification information indicates that the electronic control unit does not include the number of the drive circuits which can activate the at least one front seat door indicator and the at least one rear seat door indicator independently and is configured to activate the at least one front seat door indicator and the at least one rear seat door indicator simultaneously, perform the alerting by activating the at least one front seat door indicator and the at least one rear seat door indicator simultaneously when the front seat alerting condition becomes satisfied, and perform the alerting by activating the at least one front seat door indicator and the at least one rear seat door indicator simultaneously when the rear seat alerting condition becomes satisfied.

With the getting-out assistance apparatus according to this aspect of the present invention, the alerting is performed depending on the type of the alerting device and the destination of the vehicle. Therefore, the appropriate alerting can be provided to the occupants of the vehicle.

In the getting-out assistance apparatus according to further another aspect of the present invention, the alerting device may include at least one mirror indicator mounted on at least one side mirror of the vehicle and at least one door illuminator mounted on the at least one door of the vehicle. In this aspect, the alerting device type information may include information that the at least one mirror indicator and the at least one door illuminator are mounted as the alerting device. The electronic control unit may be configured to set a first alerting condition as the alerting condition for performing the alerting by activating the at least one mirror indicator and set a second alerting condition which is unlikely to be satisfied, compared with the first alerting condition as the alerting condition for performing the alerting by activating the at least one door illuminator.

With the getting-out assistance device according to this aspect of the present invention, the alerting can be performed depending on the type of the alerting device by setting the alerting condition depending on the type of the alerting device.

In the getting-out assistance apparatus according to further another aspect of the present invention, the alerting device may include at least one door indicator mounted on the at least one door of the vehicle and at least one door illuminator mounted on the at least one door. In this aspect, the alerting device type information may include information that the at least one door indicator and/or the at least one door illuminator is/are mounted as the alerting device. The electronic control unit may be configured to set a first alerting condition as the alerting condition for performing the alerting by activating the at least one door indicator in a situation where the alerting device type information indicates that the at least one door illuminator is not mounted as the alerting device, and the at least one door indicator is mounted as the alerting device. In addition, the electronic control unit may be configured to set a second alerting condition which is unlikely to be satisfied, compared with the first alerting condition as the alerting condition for performing the alerting by activating the at least one door indicator in a situation where the alerting device type information indicates that the at least one door indicator and the at least one door illuminator are mounted as the alerting device.

With the getting-out assistance device according to this aspect of the present invention, the alerting can be performed depending on the type of the alerting device by setting the alerting condition depending on the type of the alerting device.

Elements of the invention are not limited to elements of embodiments and modified examples of the invention described with reference to the drawings. The other objects, features and accompanied advantages of the invention can be easily understood from the embodiments and the modified examples of the invention.

DESCRIPTION OF THE EMBODIMENTS

Figure 1:
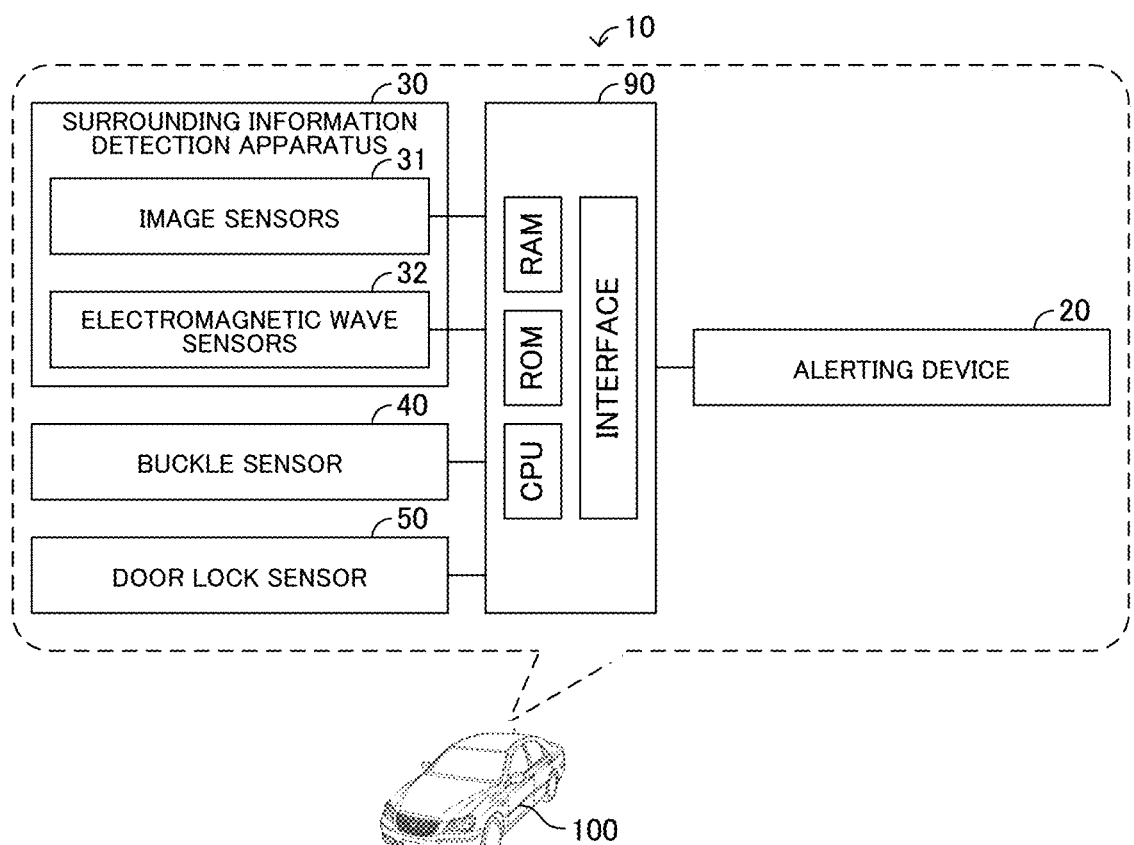
FIG. 1 is a view which shows a getting-out assistance apparatus according to an embodiment of the present invention.

Below, a getting-out assistance apparatus according to an embodiment of the present invention will be described with reference to the drawings. FIG. 1 shows the getting-out assistance apparatus 10 according to the embodiment of the present invention. The getting-out assistance apparatus 10 is installed in a vehicle 100.

As shown in FIG. 1, the getting-out assistance apparatus 10 includes an ECU (i.e., an electronic control unit) 90 as a control unit. The ECU 90 includes a microcomputer as a main component. The microcomputer includes a CPU, a storage medium such as ROM, RAM and a non-volatile memory, and an interface. The CPU is configured or programmed to realize various functions by executing instructions, or programs, or routines stored in the storage medium. In particular, in the present embodiment, the getting-out assistance apparatus 10 stores, in the storage medium, programs of realizing various controls executed by the getting-out assistance apparatus 10. It should be noted that the getting-out assistance apparatus 10 may be configured to update the programs stored in the storage medium by wireless communication (for example, Internet communication) with external devices.

The present invention can be applied to an automatic vehicle or an autonomous vehicle. The automatic driving vehicle or the autonomous driving vehicle is a vehicle which is automatically or autonomously moved by the control unit such as an ECU without a user of the vehicle carrying out driving operations to the vehicle.

Figure 2A:
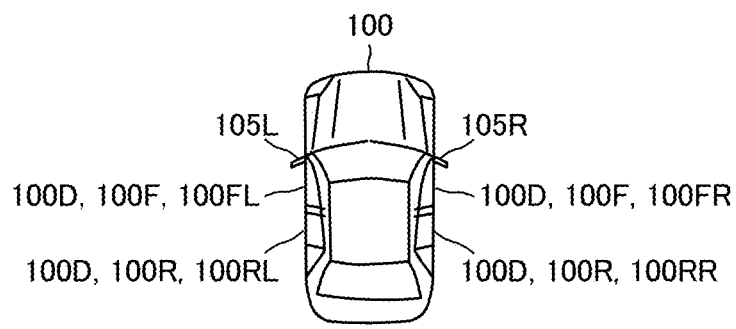
FIG. 2A is a view which shows a vehicle which is installed with the getting-out assistance apparatus according to the embodiment of the present invention.

As shown in FIG. 2A, in the present embodiment, the vehicle 100 includes at least one door 100D. The at least one door 100D includes at least one front seat door 100F and at least one rear seat door 100R. The at least one front seat door 100F includes a right front seat door 100FR and a left front seat door 100FL, and the at least one rear seat door 100R includes a right rear seat door 100RR and a left rear seat door 100RL. The right front seat door 100FR is provided on a right front side of the vehicle 100, the left front seat door 100FL is provided on a left front side of the vehicle 100, the right rear seat door 100RR is provided on a right rear side of the vehicle 100, and the left rear seat door 100RL is provided on a left rear side of the vehicle 100.

Figure 2B:
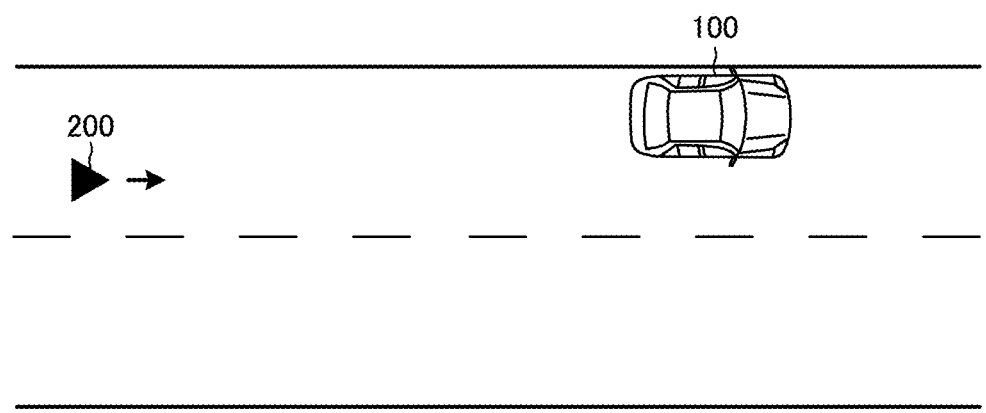
FIG. 2B is a view which shows a scene that a moving object is approaching the vehicle.

As shown in FIG. 2B, the getting-out assistance apparatus 10 is configured to perform alerting to occupants of the vehicle 100 by an alerting device 20 of the vehicle 100 in order to inform the occupants of the vehicle 100 of a presence of a moving object 200 which is approaching the vehicle 100 and has a probability of coming into contact with the at least one door 100D of the vehicle 100 if the at least one door 100D is opened. The moving object 200 is, for example, another vehicle, a two-wheeled vehicle, or a bicycle.

As shown in FIG. 1, the vehicle 100 is installed with a surrounding information detection device 30. The surrounding information detection device 30 includes image sensors 31 such as camera sensors and electromagnetic wave sensors 32 such as radar sensors. The image sensors 31 and the electromagnetic wave sensors 32 are electrically connected to the ECU 90. The getting-out assistance apparatus 10 acquires surrounding image data on views around the 100 including views behind the vehicle 100 as surrounding information IS by the image sensors 31, and acquires object data on objects around the vehicle 100 including the objects behind the vehicle 100 as the surrounding information IS by the electromagnetic wave sensors 32. The getting-out assistance apparatus 10 detects the moving object 200 based on the surrounding information IS. Further, the getting-out assistance apparatus 10 determines whether the moving object 200 has a probability of coming into contact with the at least one door 100D based on the surrounding information IS.

The alerting device 20 is installed in the vehicle 100. The alerting device 20 is electrically connected to the ECU 90. The getting-out assistance apparatus 10 controls activations of the alerting device 20. As shown in FIG. 3A to FIG. 3D, the alerting device 20 includes at least one mirror indicator 21, and/or at least one door indicator 22, and/or at least one door illuminator 23.

Figure 3A:
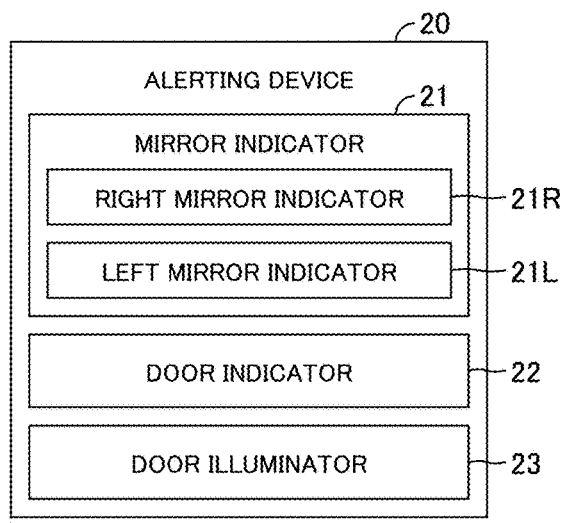
FIG. 3A is a view which shows an alerting device having a certain form.
Figure 3C:
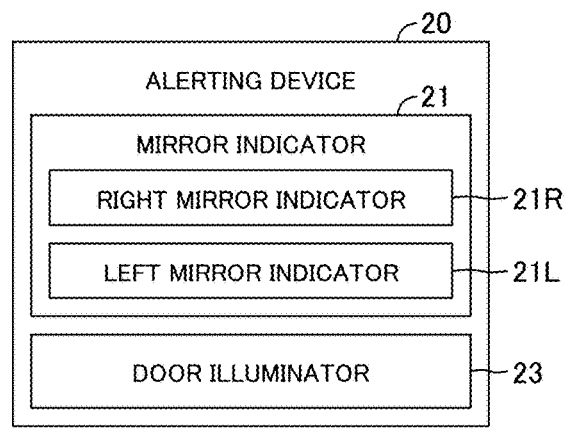
FIG. 3C is a view which shows the alerting device having further another form.
Figure 3B:
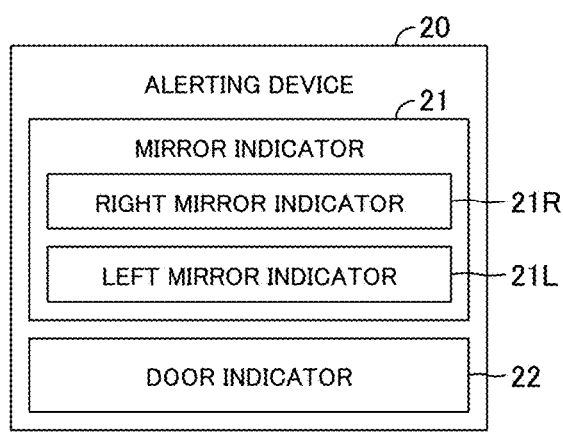
FIG. 3B is a view which shows the alerting device having another form.
Figure 3D:
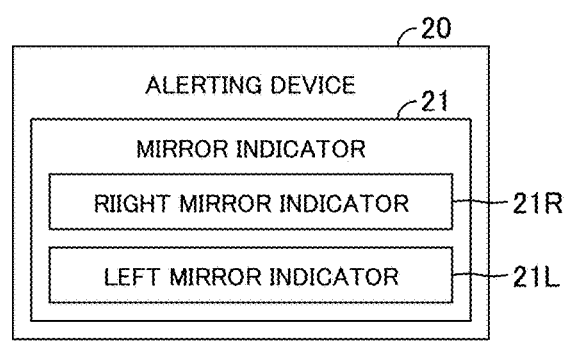
FIG. 3D is a view which shows the alerting device having further another form.

The alerting device 20 may include the at least one mirror indicator 21, the at least one door indicator 22, and the at least one door illuminator 23 as shown in FIG. 3A. Alternatively, the alerting device 20 may include only the at least one mirror indicator 21 and the at least one door indicator 22 as shown in FIG. 3B. Alternatively, the alerting device 20 may include only the at least one mirror indicator 21 and the at least one door illuminator 23 as shown in FIG. 3C. Alternatively, the alerting device 20 may include only the at least one mirror indicator 21 as shown in FIG. 3D.

Figure 4A:
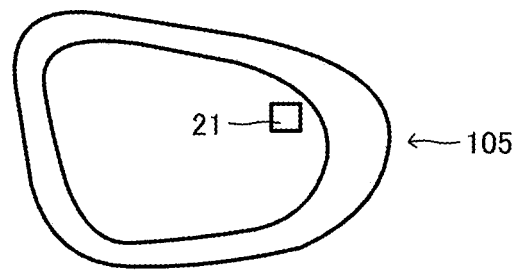
FIG. 4A is a view which shows a mirror indicator.

The at least one mirror indicator 21 is a displaying device mounted on at least one side mirror of the vehicle 100. In particular, as shown in FIG. 4A, the at least one mirror indicator 21 is a displaying device mounted on a part of at least one side mirror 105 which shows a view behind the vehicle 100. When the at least one mirror indicator 21 is activated, the at least one mirror indicator 21 displays a predetermined design image on a portion of the at least one side mirror 105 which is configured to display the view behind the vehicle 100. The predetermined design image having a relatively small size so as not to hinder a function of the at least one side mirror 105, is employed.

Figure 4B:
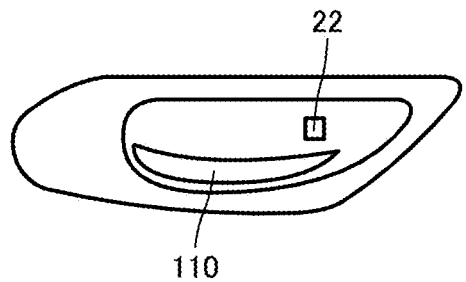
FIG. 4B is a view which shows a door indicator.

The at least one door indicator 22 is a lighting device mounted on the at least one door 100D. In particular, the at least one door indicator 22 is a lighting device mounted in the vicinity of an inner door handle 110 of the at least one door 100D as shown in FIG. 4B. When the at least one door indicator 22 is activated, the at least one door indicator 22 illuminates. In the present embodiment, the at least one door indicator 22 having a relatively small size, is employed.

Figure 4C:
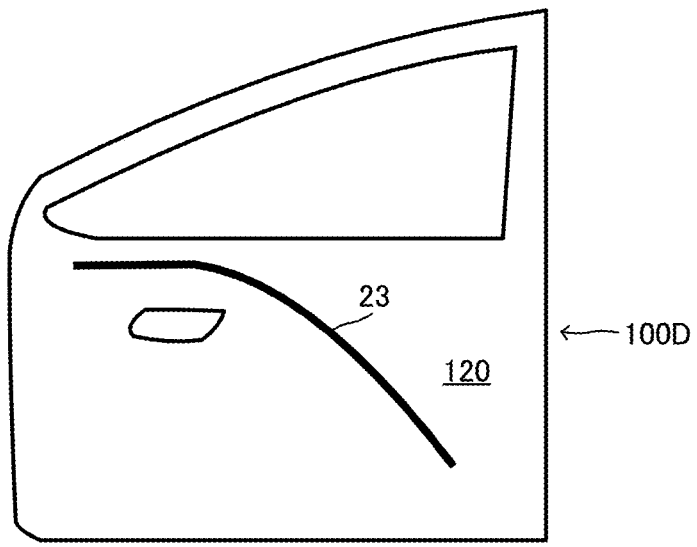
FIG. 4C is a view which shows a door illuminator.

The at least one door illuminator 23 is a lighting device mounted on the at least one door 100D. In particular, the at least one door illuminator 23 is a lighting device mounted on an inner portion 120 of the at least one door 100D as shown in FIG. 4C. When the at least one door illuminator 23 is activated, the at least one door illuminator 23 illuminates. In the present embodiment, the at least one door illuminator 23 having a relatively long length, is employed. A lighting range of the at least one door illuminator 23 is wider than a lighting range of the at least one door indicator 22.

The at least one mirror indicator 21 includes a right mirror indicator 21R and a left mirror indicator 21L as shown in FIG. 3A to FIG. 3D. The right mirror indicator 21R is mounted on a right side mirror 105R (refer to FIG. 2A) of the vehicle 100. The left mirror indicator 21L is mounted on a left side mirror 105L (refer to FIG. 2A) of the vehicle 100.

Figure 5A:
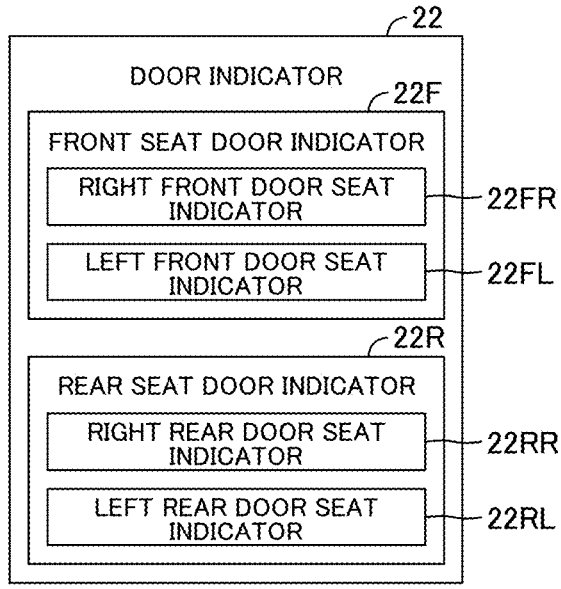
FIG. 5A is a view which shows the door indicator having a certain form.
Figure 5D:
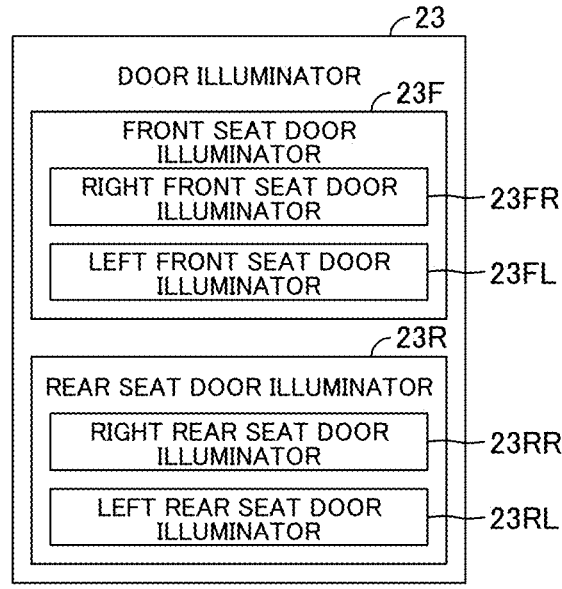
FIG. 5D is a view which shows the door illuminator having a certain form.
Figure 5B:
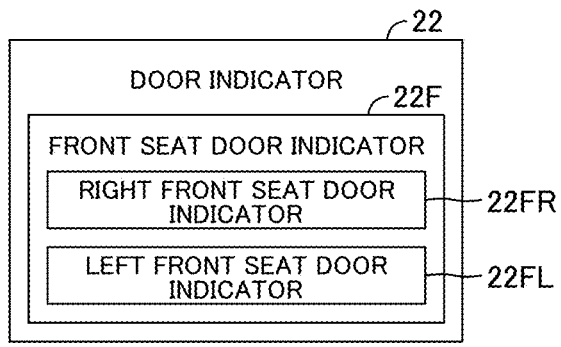
FIG. 5B is a view which shows the door indicator having another form.
Figure 5E:
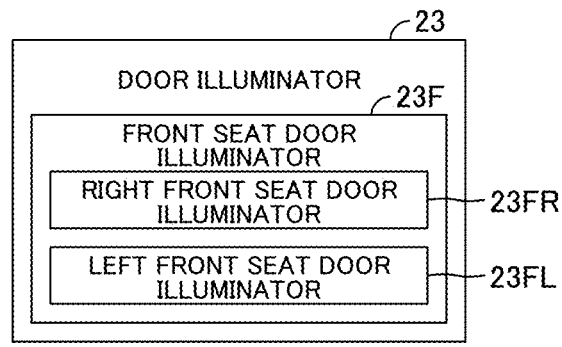
FIG. 5E is a view which shows the door illuminator having another form.
Figure 5C:
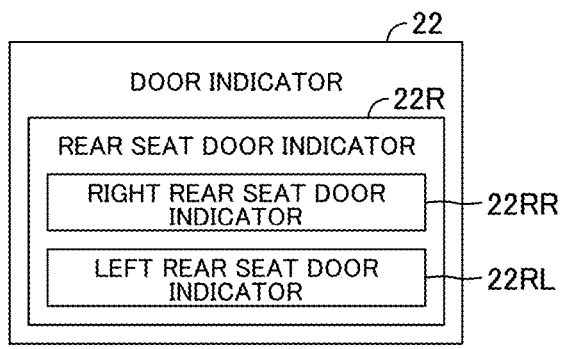
FIG. 5C is a view which shows the door indicator having further another form.

The at least one door indicator 22 includes at least one front seat door indicator 22F and/or at least one rear seat door indicator 22R as shown in FIG. 5A to FIG. 5C. The at least one front seat door indicator 22F is mounted on the at least one front seat door 100F. The at least one rear seat door indicator 22R is mounted on the at least one rear seat door 100R.

The at least one front seat door indicator 22F includes a right front seat door indicator 22FR and a left front seat door indicator 22FL. The right front seat door indicator 22FR is mounted on the right front seat door 100FR. The left front seat door indicator 22FL is mounted on the left front seat door 100FL.

The at least one rear seat door indicator 22R includes a right rear seat door indicator 22RR and a left rear seat door indicator 22RL. The right rear seat door indicator 22RR is mounted on the right rear seat door 100RR. The left rear seat door indicator 22RL is mounted on the left rear seat door 100RL.

For example, the at least one door indicator 22 may include the at least one front seat door indicator 22F and the at least one rear seat door indicator 22R as shown in FIG. 5A. Alternatively, the 22 may include only the at least one front seat door indicator 22F as shown in FIG. 5B. Alternatively, the 22 may include only the at least one rear seat door indicator 22R as shown in FIG. 5C.

Figure 5F:
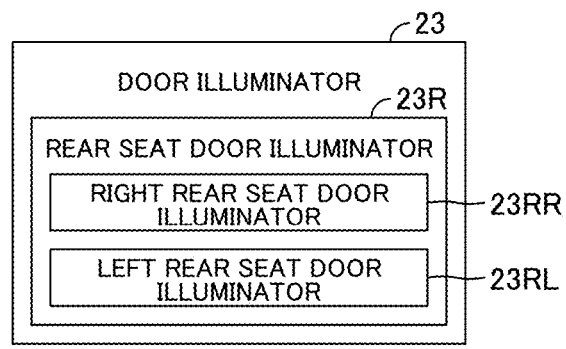
FIG. 5F is a view which shows the door illuminator having further another form.

The at least one door illuminator 23 includes at least one front seat door illuminator 23F and/or at least one rear seat door illuminator 23R as shown in FIG. 5D to FIG. 5F. The at least one front seat door illuminator 23F is mounted on the at least one front seat door 100F. The at least one rear seat door illuminator 23R is mounted on the at least one rear seat door 100R.

The at least one front seat door illuminator 23F includes a right front seat door illuminator 23FR and a left front seat door illuminator 23FL. The right front seat door illuminator 23FR is mounted on the right front seat door 100FR. The left front seat door illuminator 23FL is mounted on the left front seat door 100FL.

The at least one rear seat door illuminator 23R includes a right rear seat door illuminator 23RR and a left rear seat door illuminator 23RL. The right rear seat door illuminator 23RR is mounted on the right rear seat door 100RR. The left rear seat door illuminator 23RL is mounted on the left rear seat door 100RL.

For example, the at least one door illuminator 23 may include the at least one front seat door illuminator 23F and the at least one rear seat door illuminator 23R as shown in FIG. 5D. Alternatively, the 23 may include only the at least one front seat door illuminator 23F as shown in FIG. 5E. Alternatively, the 23 may include only the at least one rear seat door illuminator 23R as shown in FIG. 5F.

Figure 6A:
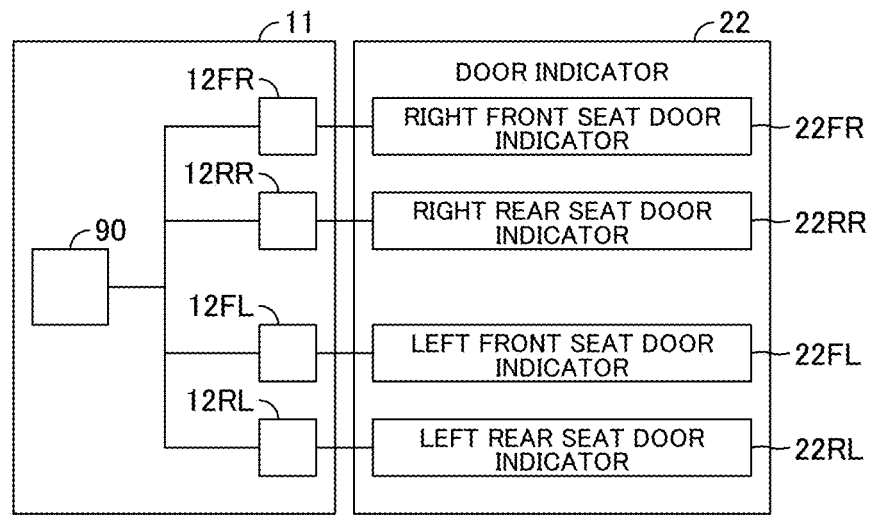
FIG. 6A is a view which shows a control unit having a certain form.
Figure 6B:
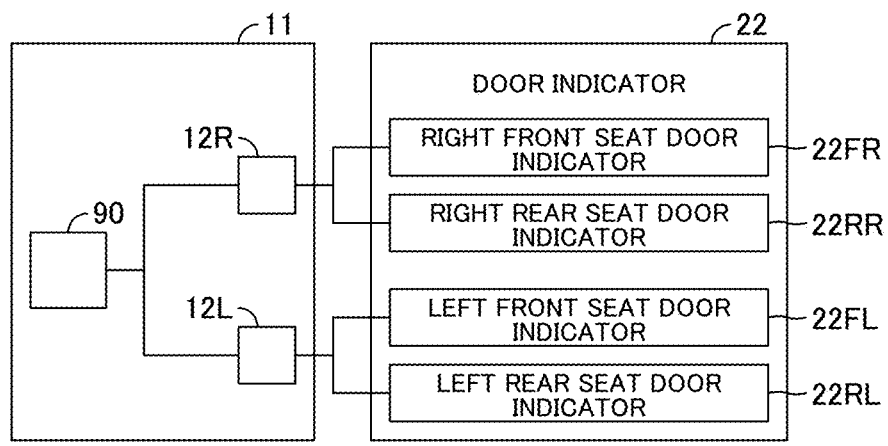
FIG. 6B is a view which shows the control unit having another form.

In addition, when the at least one door indicator 22 has a configuration shown in FIG. 5A, a control unit 11 including the ECU 90 may be configured as shown in FIG. 6A or may be configured as shown in FIG. 6B.

The control unit 11 shown in FIG. 6A includes drive circuits 12FR, 12RR, 12FL, and 12RL which actuate the right front seat door indicator 22FR, the right rear seat door indicator 22RR, the left front seat door indicator 22FL, and the left rear seat door indicator 22RL, respectively. The drive circuits 12FR, 12RR, 12FL, and 12RL are electrically connected to the ECU 90.

Thus, the control unit 11 shown in FIG. 6A is provided with the number of drive circuits which can individually actuate the at least one front seat door indicator 22F and the at least one rear seat door indicator 22R and is configured to individually actuate the at least one front seat door indicator 22F and the at least one rear seat door indicator 22R.

The getting-out assistance apparatus 10 is configured to determine an activation mode of the at least one door indicator 22 depending on control unit specification information.

The control unit specification information corresponds to information on specifications of the control unit 11. In the preset embodiment, the control unit specification information includes (i) information on the number of the drive circuits which activate the at least one door indicator 22, (ii) information on the number of the drive circuits which activate the at least one door illuminator 23, (iii) information on whether the drive circuits are configured to activate the at least one front seat door indicator 22F and the at least one rear seat door indicator 22R individually or simultaneously, and (iv) information on whether the drive circuits are configured to activate the at least one front seat door illuminator 23F and the at least one rear seat door illuminator 23R individually or simultaneously.

In a situation where the control unit specification information indicates that the control unit 11 includes the number of the drive circuits which can individually activate the at least one front seat door indicator 22F and the at least one rear seat door indicator 22R and is configured to individually activate the at least one front seat door indicator 22F and the at least one rear seat door indicator 22R, the getting-out assistance apparatus 10 performs the alerting by activating the at least one front seat door indicator 22F when a front seat alerting condition which is an alerting condition, becomes satisfied, and performs the alerting by activating the at least one rear seat door indicator 22R when a rear seat alerting condition which is the alerting condition, becomes satisfied.

In particular, in a situation where the control unit 11 is configured as shown in FIG. 6A, the getting-out assistance apparatus 10 is configured to (i) perform the alerting by activating the right front seat door indicator 22FR when a right front seat alerting condition which is the alerting condition, becomes satisfied, (ii) perform the alerting by activating the left front seat door indicator 22FL when a left front seat alerting condition which is the alerting condition, becomes satisfied, (iii) perform the alerting by activating the right rear seat door indicator 22RR when a right rear seat alerting condition which is the alerting condition, becomes satisfied, and (iv) perform the alerting by activating the left rear seat door indicator 22RL when a left rear seat alerting condition which is the alerting conditions, becomes satisfied.

On the other hand, the control unit 11 shown in FIG. 6B includes a drive circuit 12R which activates the right front seat door indicator 22FR and the right rear seat door indicator 22RR, and a drive circuit 12L which activates the left front seat door indicator 22FL and the left rear seat door indicator 22RL. The drive circuits 12R and 12L are electrically connected to the ECU 90.

Accordingly, the control unit 11 shown in FIG. 6B does not include the number of the drive circuits which can individually light the at least one front seat door indicator 22F and the at least one rear seat door indicator 22R and is configured to simultaneously activate the at least one front seat door indicator 22F and the at least one rear seat door indicator 22R.

In a situation where the control unit specification information indicates that the control unit 11 does not include the number of the drive circuits which can individually light the at least one front seat door indicator 22F and the at least one rear seat door indicator 22R and is configured to simultaneously activate the at least one front seat door indicator 22F and the at least one rear seat door indicator 22R, the getting-out assistance apparatus 10 is configured to (i) perform the alerting by simultaneously activating the at least one front seat door indicator 22F and the at least one rear seat door indicator 22R when the above-described front seat alerting condition becomes satisfied, and (ii) perform the alerting by simultaneously activating the at least one front seat door indicator 22F and the at least one rear seat door indicator 22R when the above-described rear seat alerting condition becomes satisfied.

In particular, in a situation where the control unit 11 is configured as shown in FIG. 6B, the getting-out assistance apparatus 10 is configured to (i) perform the alerting by simultaneously activating the right front seat door indicator 22FR and the right rear seat door indicator 22RR when the above-described right front seat alerting condition becomes satisfied, (ii) perform the alerting by simultaneously activating the right front seat door indicator 22FR and the right rear seat door indicator 22RR when the above-described right rear seat alerting condition becomes satisfied, (iii) perform the alerting by simultaneously activating the left front seat door indicator 22FL and the left rear seat door indicator 22RL when the above-described left front seat alerting condition becomes satisfied, and (iv) perform the alerting by simultaneously activating the left front seat door indicator 22FL and the left rear seat door indicator 22RL when the above-described left rear seat alerting condition becomes satisfied.

Figure 7A:
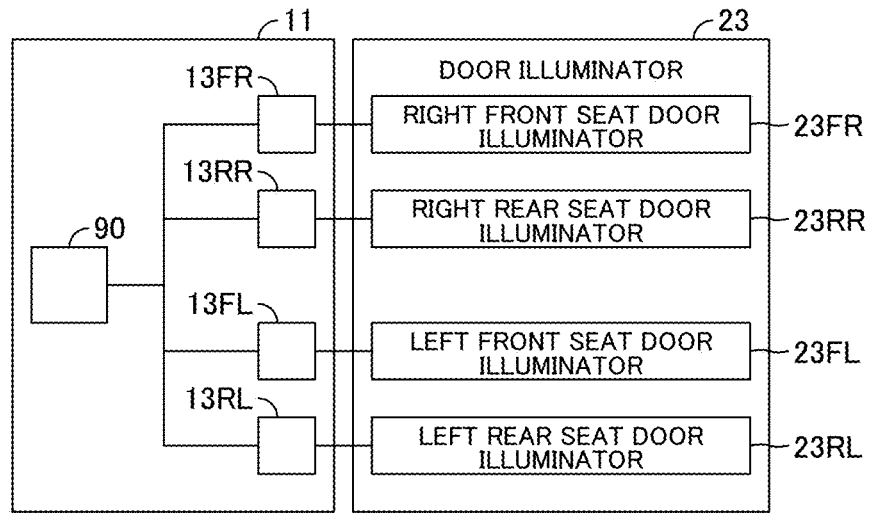
FIG. 7A is a view which shows the control unit having further another form.
Figure 7B:
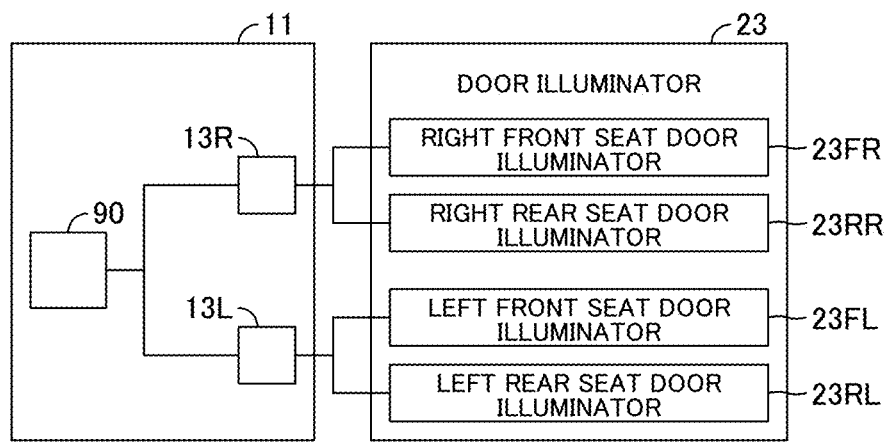
FIG. 7B is a view which shows the control unit having further another form.

In addition, when the at least one door illuminator 23 has a configuration shown in FIG. 5D, the control unit 11 including the ECU 90 may be configured as shown in FIG. 7A or may be configured as shown in FIG. 7B.

The control unit 11 shown in FIG. 7A includes drive circuits 13FR, 13RR, 13FL, and 13RL which activate the right front seat door illuminator 23FR, the right rear seat door illuminator 23RR, the left front seat door illuminator 23FL, and the left rear seat door illuminator 23RL, respectively. The drive circuits 13FR, 13RR, 13FL, and 13RL are electrically connected to the ECU 90.

Accordingly, the control unit 11 shown in FIG. 7A includes the number of drive circuits which can individually activate the at least one front seat door illuminator 23F and the at least one rear seat door illuminator 23R and is configured to individually activate the at least one front seat door illuminator 23F and the at least one rear seat door illuminator 23R.

The getting-out assistance apparatus 10 is configured to determine an activation mode of the at least one door illuminator 23 depending on the control unit specification information.

In a situation where the control device specifications indicate that the control unit 11 includes the number of the drive circuits which can individually activate the at least one front seat door illuminator 23F and the at least one rear seat door illuminator 23R and is configured to individually activate the at least one front seat door illuminator 23F and the at least one rear seat door illuminator 23R, the getting-out assistance apparatus 10 is configured to (i) perform the alerting by activating the at least one front seat door illuminator 23F when the front seat alerting condition which is the alerting condition, becomes satisfied, and (ii) perform the alerting by activating the at least one rear seat door illuminator 23R when the rear seat alerting condition which is the alerting condition, becomes satisfied.

In particular, in a situation where the control unit 11 is configured as shown in FIG. 7A, the getting-out assistance apparatus 10 is configured to (i) perform the alerting by activating the right front seat door illuminator 23FR when the right front seat alerting condition which is the alerting condition, becomes satisfied, (ii) perform the alerting by activating the left front seat door illuminator 23FL when the left front seat alerting condition which is the alerting condition, becomes satisfied, (iii) perform the alerting by activating the right rear seat door illuminator 23RR when the right rear seat alerting condition which is the alerting condition, becomes satisfied, and (iv) perform the alerting by activating the left rear seat door illuminator 23RL when the left rear seat alerting condition which is the alerting condition, becomes satisfied.

On the other hand, the control unit 11 shown in FIG. 7B includes a drive circuit 13R which activates the right front seat door illuminator 23FR and the right rear seat door illuminator 23RR, and a drive circuit 13L which activates the left front seat door illuminator 23FL and the left rear seat door illuminator 23RL. The drive circuits 13R and 13L are electrically connected to the ECU 90.

Accordingly, the control unit 11 shown in FIG. 7B does not include the number of the drive circuits which can individually illuminate the at least one front seat door illuminator 23F and the at least one rear seat door illuminator 23R and is configured to simultaneously activate the at least one front seat door illuminator 23F and the at least one rear seat door illuminator 23R.

In a situation where the control unit specification information indicates that the control unit 11 does not include the number of the drive circuits which can individually illuminates the at least one front seat door illuminator 23F and the at least one rear seat door illuminator 23R and is configured to simultaneously activate the at least one front seat door illuminator 23F and the at least one rear seat door illuminator 23R, the getting-out assistance apparatus 10 is configured to (i) perform the alerting by simultaneously activating the at least one front seat door illuminator 23F and the at least one rear seat door illuminator 23R when the above-described front seat alerting condition becomes satisfied, and (ii) perform the alerting by simultaneously activating the at least one front seat door illuminator 23F and the at least one rear seat door illuminator 23R when the above-described rear seat alerting condition becomes satisfied.

In particular, in a situation where the 11 is configured as shown in FIG. 7, the getting-out assistance apparatus 10 is configured to (i) perform the alerting by simultaneously activating the right front seat door illuminator 23FR and the right rear seat door illuminator 23RR when the above-described right front seat alerting condition becomes satisfied, (ii) perform the alerting by simultaneously activating the right front seat door illuminator 23FR and the right rear seat door illuminator 23RR when the above-described right rear seat alerting condition becomes satisfied, (iii) perform the alerting by simultaneously activating the left front seat door illuminator 23FL and the left rear seat door illuminator 23RL when the above-described left front seat alerting condition becomes satisfied, and (iv) perform the alerting by simultaneously activating the left front seat door illuminator 23FL and the left rear seat door illuminator 23RL when the above-described left rear seat alerting condition becomes satisfied.

It should be noted that whether the at least one mirror indicator 21, the at least one front seat door indicator 22F, the at least one rear seat door indicator 22R, the at least one front seat door illuminator 23F, and the at least one rear seat door illuminator 23R are mounted on the vehicle 100, may be arbitrarily determined, for example, in accordance with following guidelines.

Guideline 1: The at least one mirror indicator 21 is mounted on the vehicle 100 in principle, and is not mounted on the vehicle 100 depending on a situation such as a destination of the vehicle 100 or a type of the vehicle 100.

Guideline 2: In a situation where the at least one mirror indicator 21 is mounted, when the destination of the vehicle 100 is a specific area, the at least one front seat door indicator 22F and/or the at least one front seat door illuminator 23F is/are mounted on the vehicle 100, and the at least one rear seat door indicator 22R and/or the at least one rear seat door illuminator 23R is/are mounted on the vehicle 100. The specific are is an area where only the alerting in a specific manner (in particular, a specific design) by the at least one mirror indicator 21 is permitted, and a manner (in particular, a design) of the alerting by the at least one mirror indicator 21 mounted on the vehicle 100 is not compatible with the specific manner (in particular, the specific design).

Guideline 3: In a situation where the at least one mirror indicator 21 is not mounted, the at least one front seat door indicator 22F and/or the at least one front seat door illuminator 23F is/are mounted on the vehicle 100, and the at least one rear seat door indicator 22R and/or the at least one rear seat door illuminator 23R is/are mounted on the vehicle 100, regardless of whether the destination of the vehicle 100 is the specific area or not.

Guideline 4: In a situation where the at least one mirror indicator 21 is mounted, and the destination of the vehicle 100 is an area other than the specific area, the at least one front seat door indicator 22F, the at least one front seat door illuminator 23F, the at least one rear seat door indicator 22R, and the at least one rear seat door illuminator 23R are optionally mounted on the vehicle 100.

<Operations of Getting-Out Assistance Apparatus>

Next, operations of the getting-out assistance apparatus 10 will be described. The getting-out assistance apparatus 10 is configured to execute a routine shown in FIG. 8 at a predetermined calculation cycle. Accordingly, at a predetermined point of time, the getting-out assistance apparatus 10 starts a process from a step S800 of the routine shown in FIG. 8.

Further, the getting-out assistance apparatus 10 is configured to set the manner of the alerting by the alerting device 20 depending on at least one of the alerting device type information, the vehicle destination information, and the control unit specification information.

The alerting device type information corresponds to information on a type of the alerting device 20. For example, in a situation where the alerting device 20 includes the at least one mirror indicator 21, the at least one door indicator 22, and the at least one door illuminator 23 as shown in FIG. 3A, the alerting device type information includes information that the at least one mirror indicator 21, the at least one door indicator 22, and the at least one door illuminator 23 are mounted as the alerting device 20.

The vehicle destination information corresponds to information on the destination of the vehicle 100. In the present embodiment, the vehicle destination information includes information on the above-described specific area.

It should be noted that the control unit specification information corresponds to the above-described control unit specification information.

Further, the getting-out assistance apparatus 10 prepares a first alerting condition C1 and a second alerting condition C2 as conditions (the alerting conditions) for activating the alerting device 20.

The first alerting condition C1 corresponds to a condition that (i) the vehicle 100 is stopped, (ii) the at least one door 100D is closed, and (iii) there is a moving object 200 which is approaching the vehicle 100 and has a probability of coming into contact with the at least one door 100D if the at least one door 100D is opened.

Therefore, for example, when (i) the vehicle 100 is stopped, (ii) the right front seat door 100FR is closed, and (iii) there is a moving object 200 which is approaching the vehicle 100 and has a probability of coming into contact with the right front seat door 100FR if the right front seat door 100FR is opened, a first right front seat alerting condition as the first alerting condition C1 is established. It should be noted that the first right front seat alerting condition is the front seat alerting condition described above.

The second alerting condition C2 corresponds to a condition that (i) the vehicle 100 is stopped, (ii) the at least one door 100D is closed, (iii) a buckle of a seat belt for the occupant getting out of the at least one door 100D is released, (iv) a lock for locking the at least one door 100D is unlocked, and (v) there is a moving object 200 which is approaching the vehicle 100 and has a probability of coming into contact with the at least one door 100D if the at least one door 100D is opened.

Therefore, for example, when (i) the vehicle 100 is stopped, (ii) the right front seat door 100FR is closed, (iii) the buckle of the seat belt for the occupant getting out of the right front seat door 100FR is released, (iv) the lock for locking the right front seat door 100FR is unlocked, and (v) there is a moving object 200 which is approaching the vehicle 100 and has a probability of coming into contact with the right front seat door 100FR if the right front seat door 100FR is opened, a second right front seat alerting condition as the second alerting condition C2 is satisfied. It should be noted that the second right front seat alerting condition is the front seat alerting condition described above.

As shown in FIG. 1, a buckle sensor 40 and a door lock sensor 50 are mounted on the vehicle 100. The buckle sensor 40 and the door lock sensor 50 are electrically connected to the ECU 90. The getting-out assistance apparatus 10 detects that the buckle of the seat belt is released by the buckle sensor 40, and detects that the lock for locking the at least one door 100D is unlocked by the door lock sensor 50.

When the 10 starts the process from the step S800, the getting-out assistance apparatus 10 proceeds with the process to a step S805 to determine whether a value of a mirror indicator use flag X_M_IND has been set to "1". The value of the mirror indicator use flag X_M_IND is set based on the vehicle destination information. The value of the mirror indicator use flag X_M_IND is set to "1" when the vehicle destination information indicates that the destination of the vehicle 100 is an area region other than the specific area described above. On the other hand, the value of the mirror indicator use flag X_M_IND is set to "0" when the vehicle destination information indicates that the destination of the vehicle 100 is the specific area described above. Therefore, the getting-out assistance apparatus 10 determines whether the at least one mirror indicator 21 can be used as the alerting device 20 at the step S805.

When the 10 determines "Yes" at the step S805, the getting-out assistance apparatus 10 proceeds with the process to a step S810 to determine whether a value of a door indicator mounting flag X_D_IND has been set to "1". The value of the door indicator mounting flag X_D_IND is set based on the alerting device type information. The value of the door indicator mounting flag X_D_IND is set to "1" when the alerting device type information indicates that the at least one door indicator 22 is mounted on the vehicle 100 as the alerting device 20. On the other hand, the value of the door indicator mounting flag X_D_IND is set to "0" when the alerting device type information indicates that the at least one door indicator 22 is not mounted on the vehicle 100 as the alerting device 20. Therefore, the getting-out assistance apparatus 10 determines whether the at least one door indicator 22 is mounted on the vehicle 100 at the step S810.

When the 10 determines "Yes" at the step S810, the getting-out assistance apparatus 10 proceeds with the process to a step S815 to determine whether a value of a door illuminator mounting flag X_D_ILM has been set to "1". The value of the door illuminator mounting flag X_D_ILM is set based on the alerting device type information. The value of the door illuminator mounting flag X_D_ILM is set to "1" when the alerting device type information indicates that the at least one door illuminator 23 is mounted on the vehicle 100 as the alerting device 20. On the other hand, the value of the door illuminator mounting flag X_D_ILM is set to "0" when the alerting device type information indicates that the at least one door illuminator 23 is not mounted on the vehicle 100 as the alerting device 20. Therefore, the getting-out assistance apparatus 10 determines whether the at least one door illuminator 23 is mounted on the vehicle 100 at the step S815.

When the 10 determines "Yes" at the step S815, the getting-out assistance apparatus 10 proceeds the process to a step S820 to set a mirror indicator alerting condition M_IND (i.e., the alerting condition for activating the at least one mirror indicator 21) to the first alerting condition C1, set a door indicator alerting condition D_IND (i.e., the alerting condition for activating the at least one door indicator 22) to the second alerting condition C2, and set a door illuminator alerting condition D_ILM (i.e., the alerting condition for activating the at least one door illuminator 23) to the second alerting condition C2. Next, the getting-out assistance apparatus 10 proceeds the process to a step S895 to terminate executing this routine once.

Thereby, when the first alerting condition C1 becomes satisfied, the mirror indicator alerting condition M_IND becomes satisfied. Therefore, the at least one mirror indicator 21 is activated, and thereby the alerting to the occupant is performed. Further, when the second alerting condition C2 becomes satisfied, the door indicator alerting condition D_IND and the door illuminator alerting condition D_ILM become satisfied. Therefore, the at least one door indicator 22 and the at least one door illuminator 23 are activated. Thereby, the alerting to the occupant is performed.

Therefore, for example, when the first alerting condition C1 becomes satisfied for the right front seat door 100FR, the mirror alerting condition M_IND is satisfied for the right front seat door 100FR. Therefore, the right mirror indicator 21R is activated. Thereby, the alerting is performed to the occupant seated in a right front seat of the vehicle 100. In addition, when the second alerting condition C2 becomes satisfied for the right front seat door 100FR, the door indicator alerting condition D_IND and the door illuminator alerting condition D_ILM become satisfied for the right front seat door 100FR. Therefore, the right front seat door indicator 22FR and the right front seat door illuminator 23FR are activated. Thereby, the alerting is performed to the occupant seated in the right front seat of the vehicle 100.

It should be noted that when the first alerting condition C1 becomes satisfied for the right rear seat door 100RR, the mirror indicator alerting condition M_IND becomes satisfied for a right rear seat door 100RR, and the right mirror indicator 21R is activated.

On the other hand, when the 10 determines "No" at the step S815, the getting-out assistance apparatus 10 proceeds with the process to a step S825 to set the mirror indicator alerting condition M_IND (i.e., the alerting condition for activating the at least one mirror indicator 21) to the first alerting condition C1, and set the door indicator alerting condition D_IND (i.e., the alerting condition for activating the door indicator 22) to the second alerting condition C2. Next, the getting-out assistance apparatus 10 proceeds the process to the step S895 to terminate executing this routine once.

Thereby, when the first alerting condition C1 becomes satisfied, the mirror indicator alerting condition M_IND and the door indicator alerting condition D_IND become satisfied. Therefore, the alerting is performed to the occupant by activating the at least one mirror indicator 21 and the at least one door illuminator 23. Therefore, when the first alerting condition C1 becomes satisfied for the right front seat door 100FR, the mirror indicator alerting condition M_IND and the door indicator alerting condition D_IND become satisfied for the right front seat door 100FR. Therefore, the right mirror indicator 21R and the right front seat door illuminator 23FR are activated. Thereby, the alerting is given to the occupant.

Figure 9:
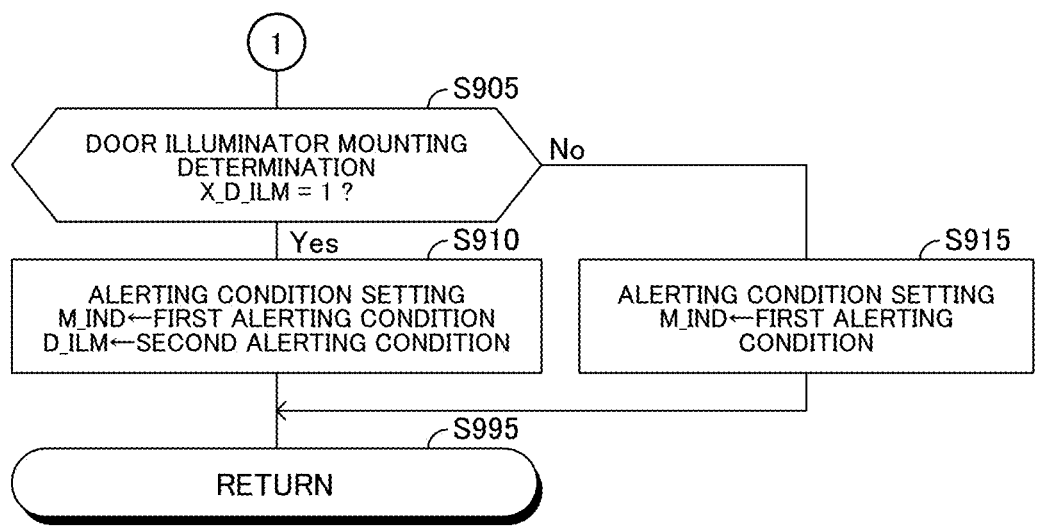
FIG. 9 is a view which shows a flowchart of a routine executed by the getting-out assistance apparatus according to the embodiment of the present invention.

Further, when the 10 determines "No" at the step S810, the getting-out assistance apparatus 10 proceeds the process to a step S905 shown in FIG. 9 to determine whether the door illuminator mounting flag X_D_ILM has been set to "1". That is, the getting-out assistance apparatus 10 determines whether the at least one door illuminator 23 is mounted on the vehicle 100 at the step S815.

When the 10 determines "Yes" at the step S905, the getting-out assistance apparatus 10 proceeds with the process to a step S910 to set the mirror indicator alerting condition M_IND to the first alerting condition C1, and set the door illuminator alerting condition D_ILM to the second alerting condition C2. Next, the getting-out assistance apparatus 10 proceeds the process to a step S995 to terminate executing this routine once.

Thereby, when the first alerting condition C1 becomes satisfied, the mirror indicator alerting condition M_IND becomes satisfied. Therefore, the at least one mirror indicator 21 is activated. Thereby, the alerting is performed to the occupant. In addition when the second alerting condition C2 becomes satisfied, the door illuminator alerting condition D_ILM becomes satisfied. Therefore, the at least one door illuminator 23 is activated. Thereby, the alerting is performed to the occupant. Therefore, when the first alerting condition C1 becomes satisfied for the right front seat door 100FR, the mirror indicator alerting condition M_IND becomes satisfied for the right front seat door 100FR. Therefore, the alerting is performed to the occupant seated in the right front seat of the vehicle 100 by activating the right mirror indicator 21R. In addition, when the second alerting condition C2 becomes satisfied for the right front seat door 100FR, the door illuminator alerting condition D_ILM becomes satisfied for the right front seat door 100FR. Therefore, the alerting is performed to the occupant seated in the right front seat of the vehicle 100 by activating the right front seat door illuminator 23FR.

On the other hand, when the 10 determines "No" at the step S905, the getting-out assistance apparatus 10 proceeds with the process to a step S915 to set the mirror indicator alerting condition M_IND to the first alerting condition C1. Next, the getting-out assistance apparatus 10 proceeds the process to the step S995 to terminate executing this routine once.

Thereby, when the first alerting condition C1 becomes satisfied, the mirror indicator alerting condition M_IND becomes satisfied. Therefore, the alerting is performed to the occupant by activating the at least one mirror indicator 21. Therefore, when the first alerting condition C1 becomes satisfied for the right front seat door 100FR, the mirror indicator alerting condition M_IND becomes satisfied for the right front seat door 100FR. Therefore, the alerting is performed to the occupant seated in the right front seat of the vehicle 100 by activating the right mirror indicator 21R.

Figure 8:
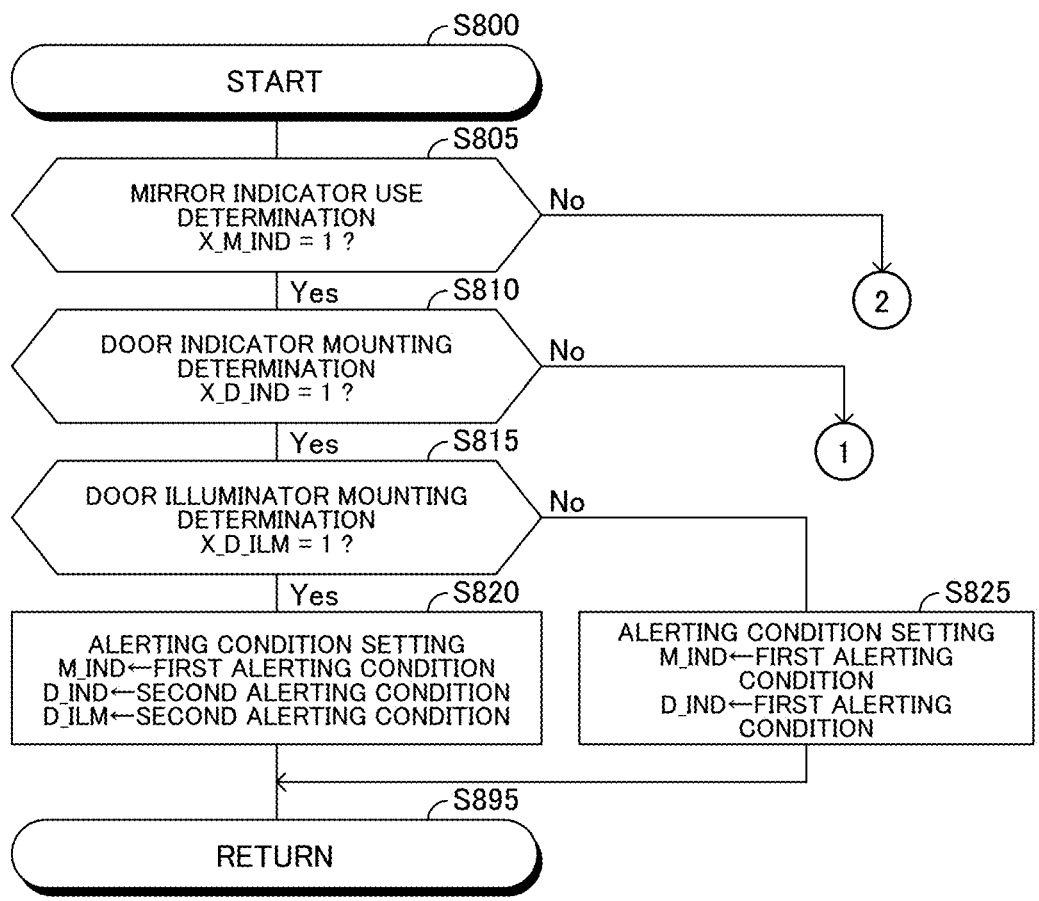
FIG. 8 is a view which shows a flowchart of a routine executed by the getting-out assistance apparatus according to the embodiment of the present invention.
Figure 10:
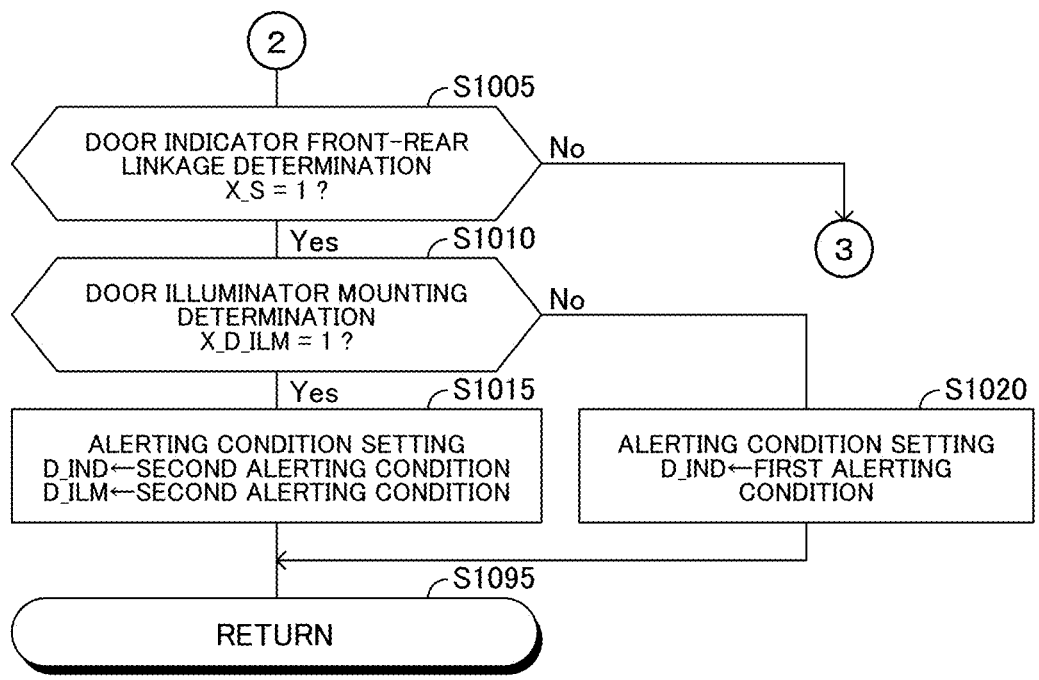
FIG. 10 is a view which shows a flowchart of a routine executed by the getting-out assistance apparatus according to the embodiment of the present invention.

Further, when the 10 determines "No" at the step S805 shown in FIG. 8, the getting-out assistance apparatus 10 proceeds the process to a step S1005 shown in FIG. 10 to determine whether a value of a door indicator front-rear linkage flag X_S has been set to "1".

The value of the door indicator front-rear linkage flag X_S is set based on the control unit specification information. The value of the door indicator front-rear linkage flag X_S is set to "1" when the control unit specification information indicates that the control unit 11 does not include the number of the drive circuits which can individually light the at least one front seat door indicator 22F and the at least one rear seat door indicator 22R and is configured to simultaneously activate the at least one front seat door indicator 22F and the at least one rear seat door indicator 22R. On the other hand, the value of the door indicator front-rear linkage flag X_S is set to "0" when the control unit specification information indicates that the control unit 11 includes the number of the drive circuits which can individually activate the at least one front seat door indicator 22F and the at least one rear seat door indicator 22R and is configured to individually activate the at least one front seat door indicator 22F and the at least one rear seat door indicator 22R. Therefore, the getting-out assistance apparatus 10 determines whether the control unit 11 is configured to activate the at least one front seat door indicator 22F and the at least one rear seat door indicator 22R simultaneously or individually at the step S1005.

When the 10 determines "Yes" at the step S1005, the getting-out assistance apparatus 10 proceeds with the process to a step S1010 to determine whether the value of the door illuminator mounting flag X_D_ILM has been set to "1". That is, the getting-out assistance apparatus 10 determines whether the at least one door illuminator 23 is mounted on the vehicle 100 at the step S1010.

When the 10 determines "Yes" at the step S1010, the getting-out assistance apparatus 10 proceeds with the process to a step S1015 to set the door indicator alerting condition D_IND to the second alerting condition C2, and set the door illuminator alerting condition D_ILM to the second alerting condition C2. Next, the getting-out assistance apparatus 10 proceeds the process to a step S1095 to terminate executing this routine once.

Thereby, when the second alerting condition C2 becomes satisfied, the door indicator alerting condition D_IND and the door illuminator alerting condition D_ILM become satisfied. Therefore, the alerting is performed to the occupant by activating the at least one door indicator 22 and the at least one door illuminator 23. Therefore, when the second alerting condition C2 becomes satisfied for the right front seat door 100FR, the door indicator alerting condition D_IND and the door illuminator alerting condition D_ILM become satisfied for the right front seat door 100FR. Thereby, the alerting is performed to the occupant by activating the right front seat door indicator 22FR and the right front seat door illuminator 23FR.

On the other hand, when the 10 determines "No" at the step S1010, the getting-out assistance apparatus 10 proceeds with the process to a step S1020 to set the door indicator alerting condition D_IND to the first alerting condition C1. Next, the getting-out assistance apparatus 10 proceeds the process to the step S1095 to terminate executing this routine once.

Thereby, when the first alerting condition C1 becomes satisfied, the door indicator alerting condition D_IND becomes satisfied. Therefore, the alerting is performed to the occupant by activating the at least one door indicator 22. Therefore, when the first alerting condition C1 becomes satisfied for the right front seat door 100FR, the door indicator alerting condition D_IND becomes satisfied for the right front seat door 100FR. Thereby, the alerting is performed to the occupant by activating the right front seat door indicator 22FR.

Figure 11:
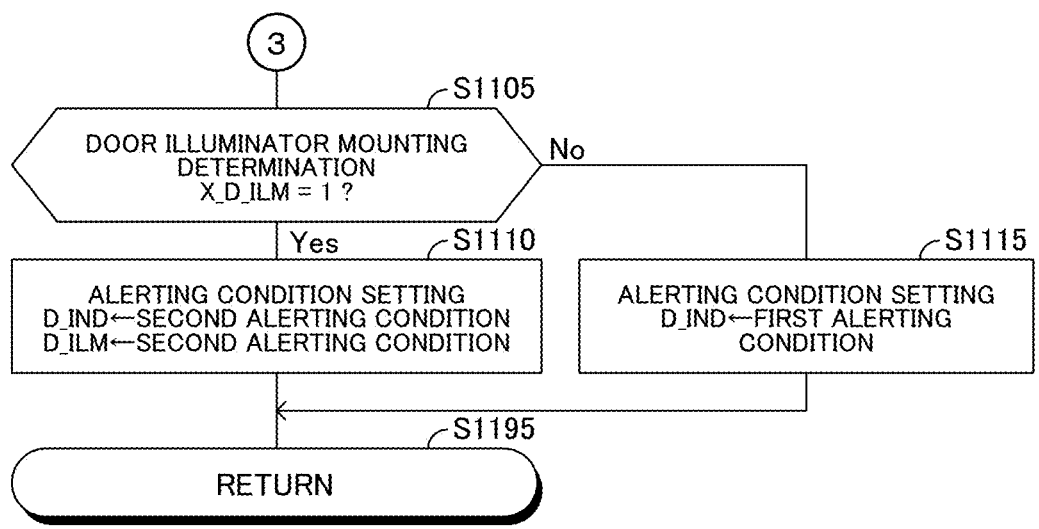
FIG. 11 is a view which shows a flowchart of a routine executed by the getting-out assistance apparatus according to the embodiment of the present invention.

Further, when the 10 determines "No" at the step S1005, the getting-out assistance apparatus 10 proceeds the process to a step S1105 shown in FIG. 11 to determine whether the door illuminator mounting flag X_D_ILM has been set to "1". That is, the getting-out assistance apparatus 10 determines whether the at least one door illuminator 23 is mounted on the vehicle 100 at the step S1105.

When the 10 determines "Yes" at the step S1105, the getting-out assistance apparatus 10 proceeds with the process to a step S1110 to set the door indicator alerting condition D_IND to the second alerting condition C2, and set the door illuminator alerting condition D_ILM to the second alerting condition C2. Next, the getting-out assistance apparatus 10 proceeds the process to a step S1195 to terminate executing this routine once.

Thereby, when the second alerting condition C2 becomes satisfied, the door indicator alerting condition D_IND and the door illuminator alerting condition D_ILM become satisfied. Therefore, the alerting is performed to the occupant by activating the at least one door indicator 22 and the at least one door illuminator 23. Therefore, when the second alerting condition C2 becomes satisfied for the right front seat door 100FR, the door indicator alerting condition D_IND and the door illuminator alerting condition D_ILM become satisfied for the right front seat door 100FR. Thereby, the alerting is performed to the occupant by activating the right front seat door indicator 22FR and the right front seat door illuminator 23FR.

On the other hand, when the 10 determines "No" at the step S1105, the getting-out assistance apparatus 10 proceeds with the process to a step S1115 to set the door indicator alerting condition D_IND to the first alerting condition C1. Next, the getting-out assistance apparatus 10 proceeds the process to the step S1195 to terminate executing this routine once.

Thereby, when the first alerting condition C1 becomes satisfied, the door indicator alerting condition D_IND becomes satisfied. Therefore, the alerting is performed to the occupant by activating the at least one door indicator 22. Therefore, when the first alerting condition C1 becomes satisfied for the right front seat door 100FR, the door indicator alerting condition D_IND becomes satisfied for the right front seat door 100FR. Thereby, the alerting is performed to the occupant by activating the right front seat door indicator 22FR.

The operations of the getting-out assistance apparatus 10 have been described. According to the getting-out assistance apparatus 10, the alerting is performed depending on the type of the alerting device 20, the destination of the vehicle 100, and the specifications of the control unit 11. Therefore, an appropriate alerting can be performed to the occupant of the vehicle 100.

It should be noted that the present invention is not limited to the above-described embodiments, and various modifications can be adopted within the scope of the present invention.

What is claimed is:

1. A getting-out assistance apparatus, comprising an electronic control unit which is configured to perform alerting to an occupant of a vehicle by an alerting device of the vehicle to inform the occupant of a presence of a moving object when a predetermined alerting condition becomes satisfied,
    the moving object being an object which is approaching the vehicle and has a probability of coming into contact with at least one door of the vehicle if the at least one door is opened,
    wherein the electronic control unit is configured to determine a manner of the alerting performed by the alerting device depending on at least one of alerting device type information, vehicle destination information, and control unit specification information,
    the alerting device type information corresponds to information on a type of the alerting device installed in the vehicle,
    the vehicle destination information corresponds to information on a destination of the vehicle, and
    the control unit specification information corresponds to information specifications of the electronic control unit which activates the alerting device.

2. The getting-out assistance apparatus as claimed in claim 1,
    wherein the alerting device includes at least one mirror indicator, and/or at least one door indicator, and/or at least one door illuminator,
    the at least one mirror indicator is an indicator mounted on at least one side mirror of the vehicle,
    the at least one door indicator is an indicator mounted on the at least one door,
    the at least one door illuminator is an illuminator mounted on the at least one door, and
    the alerting device type information includes information that the at least one mirror indicator, or the at least one door indicator, or the at least one door illuminator is mounted as the alerting device.

3. The getting-out assistance apparatus as claimed in claim 1,
    wherein the alerting device includes at least one mirror indicator mounted on at least one side mirror of the vehicle,
    the alerting device type information includes information that the at least one mirror indicator is mounted as the alerting device,
    the vehicle destination information includes information on a predetermined area which corresponds to an area where a predetermined manner of the alerting performed by the at least one mirror indicator is permitted, and
    the electronic control unit is configured to perform the alerting by activating the at least one mirror indicator when (i) the alerting device type information indicates that the at least one mirror indicator is mounted as the alerting device, and (ii) the vehicle destination information indicates that the destination of the vehicle is an area other than the predetermined area.

4. The getting-out assistance apparatus as claimed in claim 3, wherein the electronic control unit is configured to perform the alerting by activating the at least one mirror indicator when (i) the alerting device type information indicates that the at least one mirror indicator is mounted as the alerting device, (ii) the vehicle destination information indicates that the destination of the vehicle is the predetermined area, and (iii) the manner of the alerting performed by the at least one mirror indicator is permitted at the predetermined area.

5. The getting-out assistance apparatus as claimed in claim 1,
    wherein the alerting device includes at least one front seat door indicator mounted on at least one front seat door of the vehicle and at least one rear seat door indicator mounted on at least one rear seat door of the vehicle,
    the alerting device type information includes information that the at least one front seat door indicator and the at least one rear seat door indicator are mounted as the alerting device,
    the control unit specification information includes (i) information on the number of drive circuits which activates the at least one front seat door indicator and the at least one rear seat door indicator, and (ii) information on whether the at least one front seat door indicator and the at least one rear seat door indicator are activated by the drive circuits independently or simultaneously, and
    the electronic control unit is configured to:
        in a situation where (i) the alerting device type information indicates that the at least one front seat door indicator and the at least one rear seat door indicator are mounted as the alerting device, and (ii) the control unit specification information indicates that the electronic control unit includes the number of the drive circuits which can activate the at least one front seat door indicator and the at least one rear seat door indicator independently and is configured to activate the at least one front seat door indicator and the at least one rear seat door indicator independently,
        perform the alerting by activating the at least one front seat door indicator when a front seat alerting condition as the alerting condition becomes satisfied, and
        perform the alerting by activating the at least one rear seat door indicator when a rear seat alerting condition as the alerting condition becomes satisfied; and
        in a situation where (i) the alerting device type information indicates that the at least one front seat door indicator and the at least one rear seat door indicator are mounted as the alerting device, and (ii) the control unit specification information indicates that the electronic control unit does not include the number of the drive circuits which can activate the at least one front seat door indicator and the at least one rear seat door indicator independently and is configured to activate the at least one front seat door indicator and the at least one rear seat door indicator simultaneously, perform the alerting by activating the at least one front seat door indicator and the at least one rear seat door indicator simultaneously when the front seat alerting condition becomes satisfied, and perform the alerting by activating the at least one front seat door indicator and the at least one rear seat door indicator simultaneously when the rear seat alerting condition becomes satisfied.

6. The getting-out assistance apparatus as claimed in claim 1, wherein the alerting device includes at least one mirror indicator mounted on at least one side mirror of the vehicle and at least one door illuminator mounted on the at least one door of the vehicle, the alerting device type information includes information that the at least one mirror indicator and the at least one door illuminator are mounted as the alerting device, and the electronic control unit is configured to set a first alerting condition as the alerting condition for performing the alerting by activating the at least one mirror indicator and set a second alerting condition which is unlikely to be satisfied, compared with the first alerting condition as the alerting condition for performing the alerting by activating the at least one door illuminator.

7. The getting-out assistance apparatus as claimed in claim 1, wherein the alerting device includes at least one door indicator mounted on the at least one door of the vehicle and at least one door illuminator mounted on the at least one door, the alerting device type information includes information that the at least one door indicator and/or the at least one door illuminator is/are mounted as the alerting device, and the electronic control unit is configured to:
set a first alerting condition as the alerting condition for performing the alerting by activating the at least one door indicator in a situation where the alerting device type information indicates that the at least one door illuminator is not mounted as the alerting device, and the at least one door indicator is mounted as the alerting device; and set a second alerting condition which is unlikely to be satisfied, compared with the first alerting condition as the alerting condition for performing the alerting by activating the at least one door indicator in a situation where the alerting device type information indicates that the at least one door indicator and the at least one door illuminator are mounted as the alerting device.

* * * * *